July 26, 1949.   A. O. HINCHLIFF   2,477,455
ELECTRIC COMMUTATOR
Filed Dec. 3, 1947   2 Sheets-Sheet 1

Inventor
ARTHUR ORBEL HINCHLIFF

By Frederick E. Harris
Attorney

July 26, 1949. A. O. HINCHLIFF 2,477,455
ELECTRIC COMMUTATOR
Filed Dec. 3, 1947 2 Sheets-Sheet 2
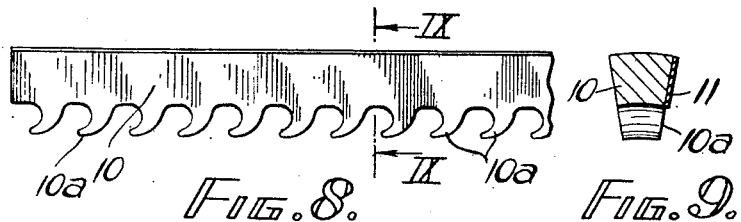
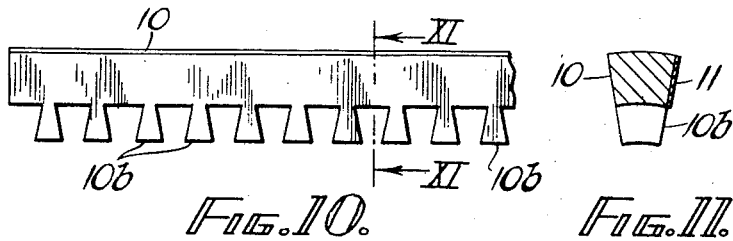
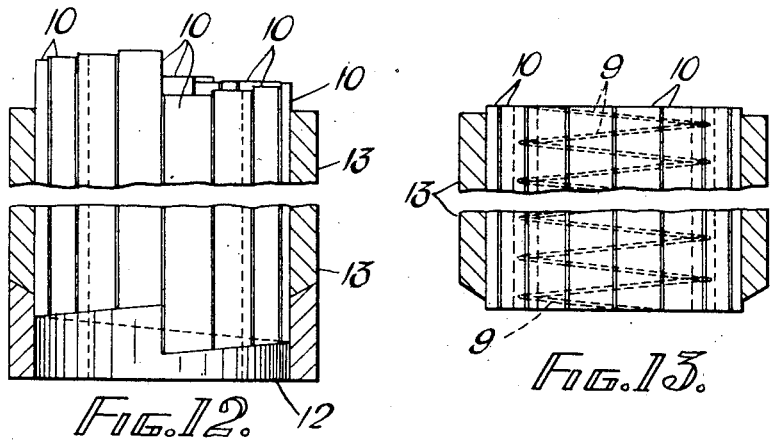
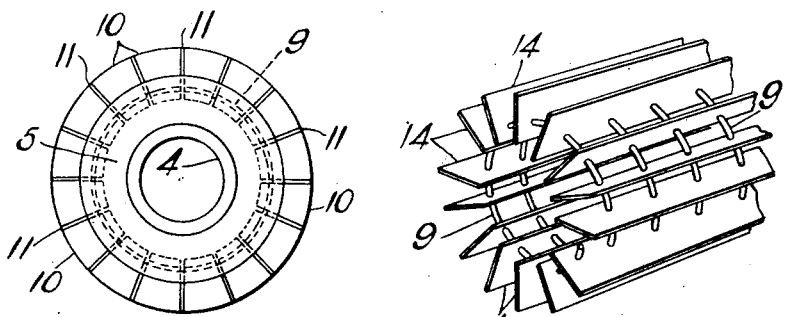
Inventor
ARTUR ORBEL HINCHLIFF
By Frederick E. Hane
Attorney Patented July 26, 1949

2,477,455

UNITED STATES PATENT OFFICE 2,477,455

ELECTRIC COMMUTATOR

Arthur Orbel Hinchliff, Surrey, England, assignor to Watliff Company Limited, London, England, a British company Application December 3, 1947, Serial No. 789,400
In Great Britain April 11, 1946

Section 1, Public Law 690, August 8, 1946
Patent expires April 11, 1966

7 Claims. (Cl. 171—321)

This invention relates to electric commutators, and refers particularly to electric commutators of the kind in which the metal segments are embedded in moulded synthetic resin. In commutators of this kind difficulty has been heretofore experienced in finding easily performed methods of providing strong anchorage for the segments in the moulding material. Another difficulty is the provision of suitable metal reinforcement for the moulding which, with hitherto known synthetic resin materials, is not strong enough to resist the stresses set up by centrifugal force on the segments at high speeds of rotation.

The present invention has for its object the provision of easily made fully effective anchorages for the segments and also the provision of easily assembled reinforcement for the moulding material when such is required.

The invention consists broadly of a commutator, wherein the segments are formed in their inner surfaces with teeth so correlated as to extend in succession helically around the commutator axis, and said segments are secured together by means of insulating moulding material in which said teeth engage.

In order that the invention may be the more clearly understood a number of embodiments thereof will now be described, reference being made to the accompanying drawings, wherein:

Figure 8 is an elevation of a segment employed in the production of another commutator in accordance with the invention.

Figure 9 is a cross section on line IX—IX of Figure 8.

Figure 10 is an elevation of an alternative form of segment employed in the production of said commutator.

Figure 11 is a cross section on line XI—XI of Figure 10.

Figure 12 is a part sectional elevation illustrating a stage in the production of said commutator from segments according to Figure 8 or 9.

Figure 13 is a similar view illustrating a further stage.

Figure 14 is an end elevation of the completed commutator.

Figure 15 is a perspective view illustrating a stage in the production of another commutator in accordance with the invention.

Describing first the process illustrated in Figures 1 to 6, this is a process suitable for the manufacture of small commutators up to say one inch in diameter. In this process the commutator segments are made from tubular blanks cut from extruded tube of a free machining copper alloy. These blanks may be initially cut to the length of an individual commutator, or, for large scale production, the blanks may take the form of lengths of tube each of which is the multiple of the length of a commutator, and after all the operations are completed, including moulding, the individual commutators are parted off. The maximum length of such blanks is largely limited by the difficulties of moulding.

Figure 1:
Figure 1 is a sectional elevation illustrating a given stage in the processing of a tubular blank for the production of a commutator in accordance with the invention.
Figure 2:
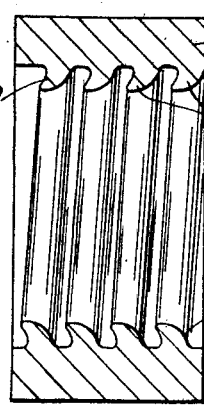
Figure 2 is a similar view of the same after a subsequent stage.

In the example illustrated Figures 1 to 6 the tubular blank is initially cut off to the length of an individual commutator. In the first stage of the manufacturing process the blank 1 is threaded internally with a buttress thread 2 by tapping in the usual way. This stage is illustrated in Figure 1. Next a deforming tool is forced through the bore in such a way as to curl over the buttress thread at the tip and give it a hook shaped section as shown in Figure 2.

Figure 7:
Figure 7 is an elevation to a much smaller scale of a tool employed in effecting the processing stages of Figures 1 and 2.

It is advantageous in production to make the tap and the deforming tool in one unit as shown in Figure 7. This unit consists of a rod with a tap 7 formed at its forward end and with one or more smooth deforming enlargements or bullets 8 formed on its periphery to the rear of the tap. The tap is screwed through the blank 1 to cut the buttress thread and subsequently, in a continuing operation the bullet or bullets 8 are forced through to curl the thread over. The dimensions are best ascertained by trial for each case, but as an example it may be said that for a buttress thread having an internal diameter of .380 of an inch, the use of bullets having a maximum diameter of .405 of an inch will produce a satisfactory hook shape when the buttress thread has a tooth angle of 70 degrees.

Figure 3:
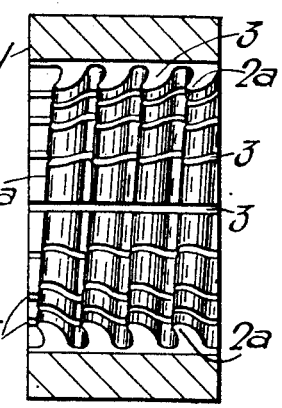
Figure 3 is a similar view of the same after a subsequent stage.
Figure 4:
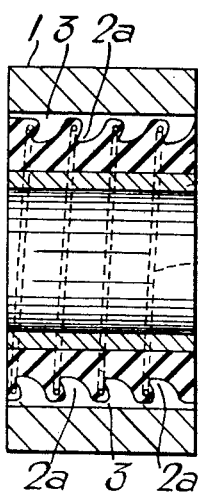
Figure 4 is a sectional elevation of the completed commutator taken on line IV—IV of Figure 6.
Figure 5:
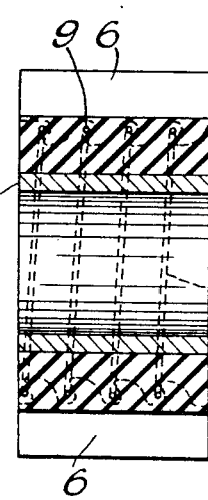
Figure 5 is a similar view of the same taken on line V—V of Figure 6.
Figure 6:
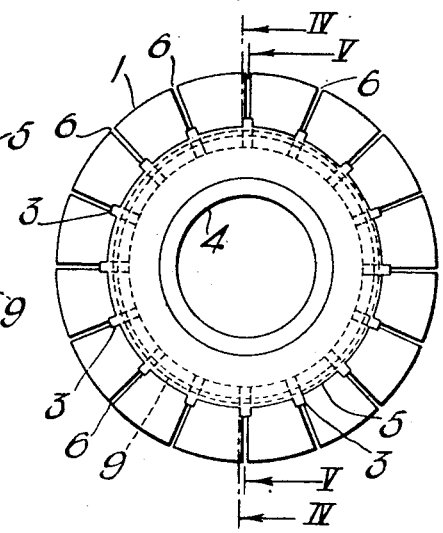
Figure 6 is an end view of the completed commutator.

After the thread 2 has been deformed as shown in Figure 2, a number of equally spaced longitudinal internal slots 3 are cut in radial planes through the thread so that said thread is divided into a multiplicity of hook shaped teeth 2a. The number of these slots must correspond with the number of finished segments required in the finished commutator. These slots may be formed either by broaching or by cutting individual saw cuts. The condition is now as illustrated in Figure 3.

The copper blank 1 with the internal teeth 2a is now arranged in a mould with a bush 4 coaxially within it and the usual synthetic resin moulding material 5 is injected into the annular space between said blank and said bush. The moulding material will key intimately with the teeth 2a and will flow into the slots 3 between said teeth.

Finally the unit is mounted on a dividing head and the final sub dividing slots 6 are cut in radial planes into the blank 1 from the outer periphery thereof so as to join respectively with the internal slots 3. These slots 6 may be cut by means of a circular saw to a depth sufficient just to meet the internal slots, and without cutting into the hook-shaped helical channel which is filled with the moulding material. The segments are now fully divided and the commutator is complete and can be mounted on a shaft by means of the bush 4 which is bored for that purpose.

To enable the slots 6 to be cut at the correct positions, a mark was cut before the moulding operation on the outer periphery of the blank opposite to the centre of one of the internal slots.

The internal slots 3 are made wider than the final sub dividing slots 6 so that small inaccuracies in the cutting of either set of slots can be permitted without the slots failing to meet and fully divide the blank. As an example if the sub-dividing slots 6 were .020 of an inch, the internal slots 3 could be .040 of an inch. It will be appreciated that the object of first cutting the internal slots 3 is to avoid cutting through the moulding material in the helical channel when the final sub-dividing of the segments is effected.

In a commutator made in this way, the full strength of the moulding material in the hook-shaped helical channel is preserved.

For small commutators required to work at moderate speeds, the hook shaped anchorages in the moulding material, produced as heretofore described, will be found of adequate strength, but one very advantageous feature of the invention is the possibility afforded by the screwed or helical formation of the anchorages of having a helical spring of wire 9 threaded into the thread channel. This when moulded in place by the moulding material forms a very strong re-inforcement of the finished moulded structure, such that the highest speeds required in practice can be withstood.

Hitherto, reinforcement of commutator mouldings has had to be carried out by means of metal rings usually disposed at each end of the segments in annular recesses formed in said segments. This method raises problems of locating and holding such reinforcing rings during the moulding process, while the rings themselves are not easy to produce cheaply and accurately.

The helical wire spring 9 employed as reinforcement in the present arrangement is cheap to produce and easy to assemble and is located during moulding. Moreover such reinforcement strengthens the moulding at the exact points of maximum stress.

To prevent said reinforcing spring 9 from electrically short circuiting the commutator segments against which it may be pressed by the flow of moulding material during moulding, it is necessary to provide such spring with an electrically insulating covering or skin, or alternatively the spring must be positively located against movement and contact with the segments during moulding.

One method of insulating said spring 9 is to cover the wire with an insulating sleeving of glass fibre.

In the case when, as above described, the individual commutators are cut off from relatively long lengths, the reinforcing springs 9 can equally well be employed. A long helical spring will be threaded into the helical channel prior to the moulding operation, and this spring will be cut into the individual springs 9 by parting off the individual commutators.

Referring now to Figures 8 to 14, these figures illustrate another method of making commutators in accordance with the invention which it is preferred to adopt for commutators of larger size, say of two inches diameter and more. In accordance with this method the copper segments are made from drawn copper strip 10 of V section in the usual manner, and the anchorages are formed by stamping out teeth of appropriate shape from the inner edge of the strips by punch and die methods. In Figures 8 and 9 a strip 10 is illustrated with hook-shaped teeth 10a, of similar shape to the teeth 2a of the preceding embodiment, formed on its inner edge. In Figures 10 and 11 an alternative strip 10 is illustrated with teeth 10b of dove-tail shape formed on its inner edge. The teeth 10a can be stamped in the hook shape shown, or they can be stamped as straight teeth and subsequently bent over by means of a suitable tool. The teeth 10b must of course be stamped in their dove tail form.

For these larger commutators it is usual to insulate the segments from each other by means of strips of micanite or glass fibre bonded with synthetic resin and to aid assembly separating strips 11 of the material may be stuck, by means of a suitable adhesive, each against one face of a respective strip 10. As shown, the strips 11 need be only of sufficient width to cover that part of the strip 10 which is above the anchorage teeth.

The strips employed in the present method are made of a length several times that of the finished commutators, so that after said strips and the reinforcement are assembled and moulded together (as will now be described) the finished commutators can be parted off. In this way many economies of production are achieved over the present methods whereby individual commutator assemblies are built by hand and moulded separately.

The V section strips 10 are assembled face to face so as to form a tubular structure, and they are progressively offset longitudinally with respect to each other in such a way that the notches between the teeth 10a (or 10b) form a continuous helical channel extending internally from end to end of said tubular structure in the same way as the helical channel between the teeth 2a extends internally throughout the tubular blank 1 of the preceding embodiment. To effect this assembly the jig illustrated in Figure 12 is employed. This comprises a horizontal disc-shaped base piece 12 upon whose upper surface the lower ends of the assembled strips 10 are adapted to be rested. This upper surface of the base piece is given a helical form, as indicated, in such a way that by resting the lower ends of the strips on it as stated the necessary endwise relative displacement of the strips is automatically effected. The jig also comprises a surrounding clamp 13 which clamps the strips together after they have attained their correct relative longitudinal location, and, by means of this clamp the strips are removed from the base piece 12. The strips then have their ends cut off level with each other as in Figure 13, after which the insulated wire reinforcing spring 9 is threaded into the helical channel. The diameter of said spring is chosen so as to fit snugly into the helical channel, but not so tightly that it cannot be screwed easily into place. It must of course leave space in the channel for the flow of moulding material therein. The whole is now placed in a mould where a bush 4 is inserted and the moulding operation is effected in a similar manner to that of the preceding embodiment. The individual commutators can now be cut off from the assembled and moulded length. By way of example, from an assembly which is eleven inches long ten commutators each one inch long can be cut, the extra inch being sufficient allowance for the saw cutting. Thus great economies in manufacture result. Three or four, or even more turns of reinforcing spring 9 can be provided in each individual commutator and thus very strong reinforcement is provided.

Referring now to Figure 15 this illustrates another method which is somewhat similar to that of Figures 8 to 14. In this method micanite or glass fibre separators 14 are first each formed with longitudinally spaced holes and by means of these holes said separators are threaded successively on to the reinforcing spring 9 as shown in Figure 15. Copper strips 10 similar to that illustrated in Figure 8 or Figure 10 (but of course without the separators 11) are inserted between the separators 14 and arranged so that the spring 9 lies in the spaces between the teeth 10a (or 10b). The tubular structure so formed is then clamped, and, as in the preceding embodiment, its ends are squared off and the moulding operation is performed after which the individual commutators are parted off. In this method the helical spring 9 exercises a similar function as the base piece 12 in determining the correct relative longitudinal displacement of the strips 10 and separators 14. In this method it is not necessary for the spring 9 to have an insulating coating since it may be located accurately by the separators 14 in the centre of the spiral groove formed by the spaces between the teeth 10a (or 10b) and firmly held in that position when the assembly is clamped and moulded.

In all three embodiments, in order that the wire spring 9 may be securely keyed to the moulding material and thus act as a proper reinforcement against bursting it is necessary that it should, if made of steel, be nicked at intervals or have its surface roughened by light knurling. When this keying of the spring to the moulding material is effectively done, any bursting stress in the moulding material is transferred to the spring as a tensile stress along the axis of the wire forming the spring.

Among other, the following advantages accruing from the invention may be enumerated:

(a) Owing to the plurality of anchorages provided between the metal segments and the moulding material, only the minimum radial depth of metal is required in the segments, thus economising in materials and reducing centrifugal stresses when running.

(b) Manufacture in long lengths with reinforcement is rendered easy and given greatly reduced production costs.

(c) The re-inforcement by wire spring gives high strength against bursting and the flexibility of the spring relieves the moulding material of internal shrinkage stresses after moulding, particularly when moulded in long lengths.

(d) The spring re-inforcement is easily and cheaply made and consumes the minimum of material, while providing high strength.

(e) The principle of the invention is equally advantageous for the construction of small or large commutators.

The invention is not limited to the teeth forming only a single helical row but contemplates the possibility of the teeth forming two or even more helical rows in the manner of a two or more start thread.

What is claimed is:

1. A commutator comprising a plurality of conducting segments assembled in a circular series, the inner portions of said segments being formed with apertures so correlated as to form a series lying in a helical path around the axis of said circular series, and insulating moulding material embedding the inner portions of said segments and extending within said apertures, said moulding material thereby securing said segments in assembled relation.

2. A commutator comprising a plurality of conducting segments assembled in a circular series, said segments having teeth formed on their inner surfaces, which are so correlated as to form a series lying in a helical path around the axis of said circular series, and insulating moulding material embedding the inner portions of said segments and extending into the spaces between said teeth, said moulding material thereby securing said segments in assembled relation.

3. A commutator comprising a plurality of conducting segments assembled in a circular series, said segments having undercut teeth formed on their inner surfaces, which are so correlated as to form a series lying in a helical path around the axis of said circular series, and insulating moulding material embedding the inner portions of said segments and extending into the spaces between said teeth, said moulding material thereby securing said segments in assembled relation.

4. A commutator comprising a plurality of conducting segments assembled in a circular series, the inner portions of said segments being formed with apertures so correlated as to form a series lying in a helical path around the axis of said circular series, insulating moulding material embedding the inner portions of said segments and extending within said apertures, said moulding material thereby securing said segments in assembled relation, and a helical wire spring passing through the helical series of apertures and embedded in said moulding material.

5. A commutator comprising a plurality of conducting segments assembled in a circular series, said segments having teeth formed on their inner surfaces, which are so correlated that the spaces between them form a series lying in a helical path around the axis of said circular series, insulating moulding material embedding the inner portions of said segments and extending into said spaces between said teeth, said moulding material thereby securing said segments in assembled relation, and a helical wire spring passing through said helical series of spaces and embedded in said moulding material.

6. A commutator comprising a plurality of conducting segments and a plurality of insulating separators, said segments and separators being assembled in an annular series with a separator between each two adjacent segments, the inner portions of the segments being formed with apertures so correlated as to form a series lying in a helical path around the axis of said annular series, and the inner portions of the separators being formed with apertures so correlated as to form a series lying in the same helical path, insulating moulding material embedding the inner portions of said segments and separators and extending into the apertures in said segments, said moulding material thereby securing said segments and separators in assembled relation, and a helical wire spring passing through the helical series of apertures in said segments and separators, the apertures of said separators locating said wire spring and preventing contact of said wire spring with the aperture edges of said segments.

7. A commutator comprising a plurality of conducting segments and a plurality of insulating separators, said segments and separators being assembled in an annular series with a separator between each two adjacent segments, the inner portions of the segments being formed with teeth so correlated that the inter-tooth spaces lie in a helical path around the axis of said annular series, and the inner portions of the separators being formed with holes so correlated as to form a series lying in the same helical path, insulating moulding material embedding the inner portions of said segments and separators and extending into the inter-tooth spaces of said segments, said moulding material thereby securing said segments and separators in assembled relation, and a helical wire spring passing through the helical series of inter-tooth spaces in said segments and holes in said separators, the holes in said separators locating said wire spring and preventing contact of said wire spring with said segments.

ARTHUR ORBEL HINCHLIFF.

REFERENCES CITED

The following references are of record in the file of this patent:

UNITED STATES PATENTS

| Number | Name | Date |
| --- | --- | --- |
| 459,368 | Lundell | Sept. 8, 1891 |
| 2,104,141 | Stevens | Jan. 4, 1938 |
| 2,357,111 | Hemphill | Aug. 29, 1944 |
| 2,400,590 | Meyerhoefer | May 21, 1946 |
| 2,421,845 | Moeller | June 10, 1947 |